Patented Apr. 3, 1951

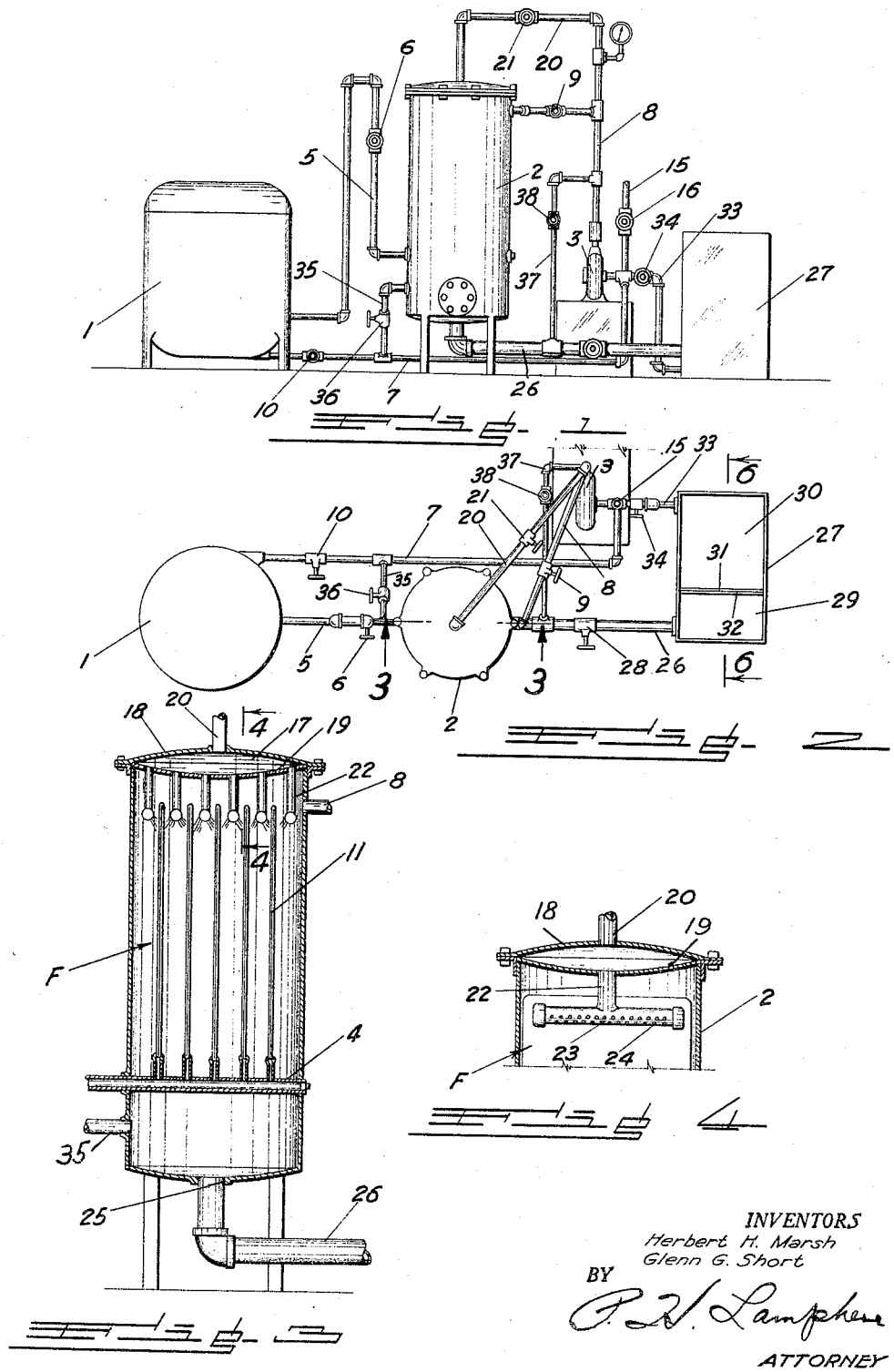

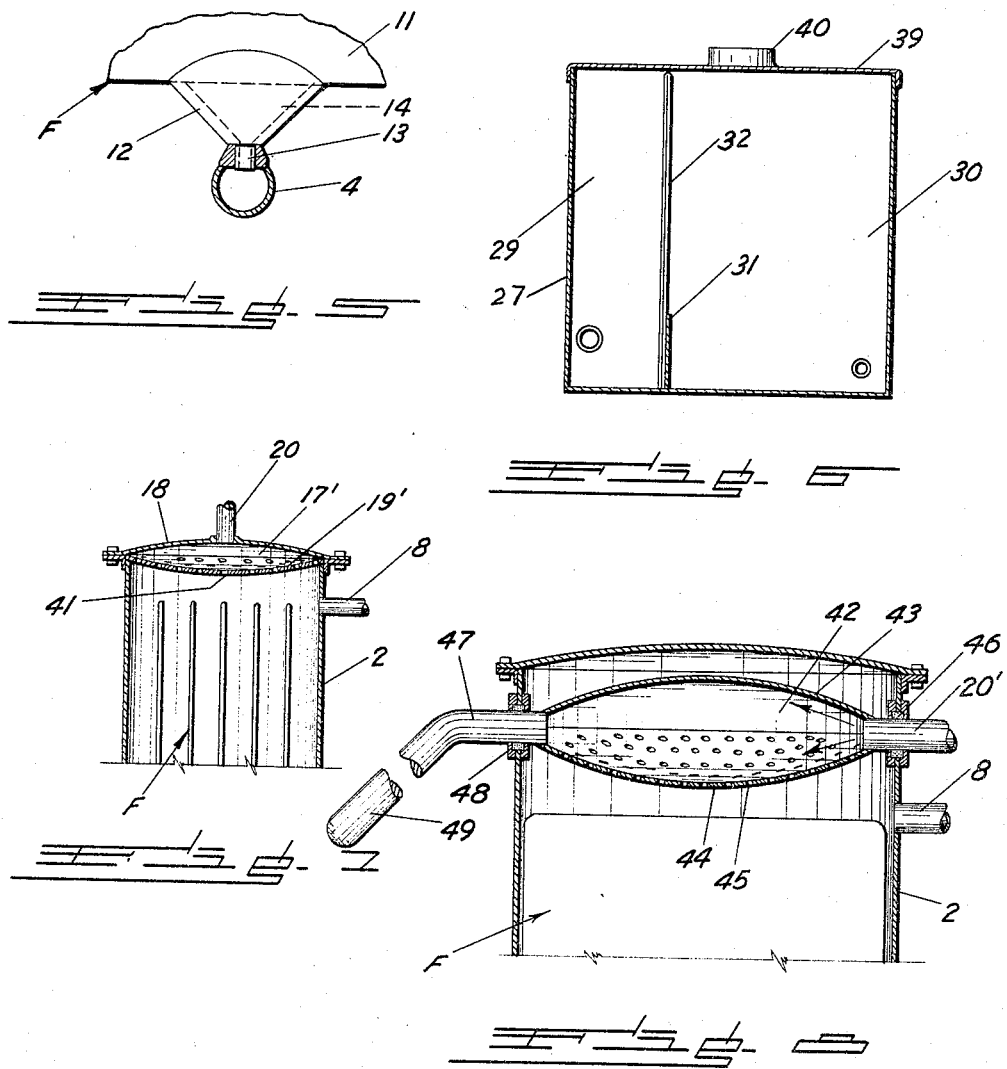

2,547,277

UNITED STATES PATENT OFFICE 2,547,277

FILTER WASHING SYSTEM

Herbert H. Marsh and Glenn G. Short, Denver, Colo.

Application July 28, 1947, Serial No. 764,162

7 Claims. (Cl. 68—18)

This invention relates to a filter washing system and more particularly to an improved system for removing dirty or contaminated filter material from filter bags or like structure in a filter tank.

One of the objects of the invention is to produce an improved and efficient system for cleaning filter bags which will eliminate the necessity of removing the bags or scraping the contaminated filter material therefrom.

Another object is to produce an improved filter cleaning system in which the filter material is removed from filter bags or the like, solely by a washing operation.

Yet another object is to so construct a filter cleaning system that filter material can be removed from a filter structure by circulating liquid and deposited in a settling tank for easy removal.

A further object is to produce an improved and efficient system for simultaneously cleaning the filter structure in a filter tank and the accumulated "muck" in the bottom of said tank.

A still further object is to associate with a filter tank improved filter bag washing means that will so distribute a washing liquid onto the filter bags that the filter material caked thereon will be fully removed without disturbing the bags and screen upon which such are mounted.

Other objects of the invention will become apparent from the following description taken in connection with the accompanying drawings showing examples of a filter washing system embodying the invention.

In the drawings:

Figure 1 is a side view of the filter washing system showing it associated with a dry cleaning washer;

Figure 2 is a top view of the system shown in Figure 1;

Figure 3 is a longitudinal sectional view through the filter unit, said view being taken on the line 3—3 of Figure 2;

Figure 4 is a sectional view showing additional details of the filter unit, said view being taken on the line 4—4 of Figure 3;

Figure 5 is a detail view partly in section showing the mounting of the filter bags and screens on the filter outlet manifold pipe;

Figure 6 is a sectional view taken on the line 6—6 of Figure 2 showing details of the settling tank;

Figure 7 is a sectional view of the top portion of a filter unit showing another washing arrangement for the filter bags; and Figure 8 is a sectional view of the top portion of a filter unit showing still another washing arrangement for the filter bags.

Referring to the drawings in detail and first to Figures 1 to 6 inclusive, our improved filter washing system is shown, by way of example, as being associated with a filter tank of a dry cleaning system, but it is to be understood that it can be associated with filter tanks of other types of systems. The dry cleaning system shown comprises a cleaning washer 1, a filter tank 2 and a pump 3. The filter tank 2 has positioned across its lower portion above the bottom wall and outlet manifold 4, as best shown in Figure 3. This manifold is connected by a conduit 5 with the cleaning washer 1, there being a hand valve 6 in the conduit to cut off the filter manifold from the washer when desired. The bottom of the washer 1 has connected thereto a conduit 7 which leads to the inlet of the pump 3. The outlet of this pump 3 is connected by a conduit 8 which leads to the upper end of the filter tank. The filter tank can be cut off from or connected to the pump 3 by a hand valve 9 and the washer can be cut off from the pump by a hand valve 10.

Within the filter tank are arranged spaced vertically positioned filters F of well known construction, comprised essentially of a screen form covered by a bag 11 of fabric, metal or other suitable material. Each of the filters F is supported on the manifold by a fan shaped holder 12 having a tubular extension 13 positioned in a hole in the top of the manifold 4, all as best seen in Figure 5. The fan shaped portion of the holder is provided with a V-shaped passage 14 whereby liquid which has been filtered through the bag part of the filters F can pass to the tubular extension 13, into the manifold 4 and then to the washer 1.

In dry cleaning systems of the type just described the cleaning liquid, which may be carbon tetrachloride, perchlorethylene and like solvents, is placed in the system from any suitable supply which may be, for example, a storage tank which is connected to the pump by a conduit 15. When the liquid has been placed in the system in sufficient quantity the storage tank will be cut off by the hand valve 16. A suitable filter material or clarification powder will then be placed in the liquid as by merely dumping it into the washer. The valves 6, 9 and 10 will then be opened so that there will be a circulation of liquid by the pump from the washer to the filter tank and from the filter tank back to the washer. The filter material or clarification powder in the liquid will then become deposited on the fabric bags of the filters as the liquid passes through the bag material and flows down into the outlet manifold. The dry cleaning system will then be ready for use and when garments are placed in the washer, the cleaning liquid will extract the dirt, solvent soaps, grease, etc. from the garments as it is circulated by the pump from the washer to the filter tank and from the filter tank back to the washer. As the dirt, grease, etc are carried from the washer into the filter, the cleaning liquid will be filtered by the filter bags upon which the filter material has been previously deposited.

After continuous cleaning of garments by the dry cleaning system the filter material on the filter bags will become dirty and contaminated and it will be necessary to clean these bags and have deposited thereon clean filter material. In the past it has been customary to remove the filter bags and screen forms and scrape the dirty filter material off the bags and then wash the bags, or to provide some kind of a mechanical scraper in the filter tank for scraping the dirty filter material off the surfaces of the bags, or a mechanical shaker arrangement. These methods of cleaning the filter bags have not proven satisfactory, since the scraping operation will result in the dirty filter material being forced into the pores of the woven fabric of the bags and its removal then becomes difficult. Also, the mechanical arrangements may easily become damaged due to the filters becoming bound in accumulated "muck" in the bottom of the tank.

In accordance with our invention, we have associated with the filter tank an improved filter cleaning system whereby the filter material deposited on the surface of the filter bags can be efficiently removed by washing without the necessity of scraping the bags or removing the bags from the filter tank. Associated with the top of the filter tank there is an auxiliary chamber 17 having for its top wall the convex top wall 18 of the filter tank and for its bottom a concave wall 19. This chamber 17 is arranged to be supplied with liquid under pressure from the previously referred to pump 3 by providing a conduit 20 leading from the conduit 8 to the chamber 17. The conduit 20 is provided with a hand cut-off valve 21. The bottom 19 of the auxiliary chamber is provided with a plurality of outlet pipes 22 which are connected at the lower end with spray pipes 23. The number of outlet and spray pipes 23 are such that there will be a spray pipe positioned between adjacent filter screens and bags and also on the outside of each outer bag. The spray pipes 23 are horizontally arranged and of such length as to be co-extensive with the width of the filter bag, all as best shown in Figure 4. The spray pipes are each provided with a plurality of longitudinally arranged spray or jet openings 24 so positioned in the pipe that liquid will be directed onto the upper portions of the surfaces of the filter bags at an acute angle and in a downward direction. In place of the spray pipes, any other suitable sprays can be employed. Since the liquid being sprayed by the pipe sprays is under pressure, the streams of liquid will engage the filter material deposited on the surface of the bag and cause it to be "peeled" off the surface of the bags. This "peeled" off filter material will then move by gravity, or be washed with the liquid to the bottom of the filter tank below the outlet manifold.

In order that the removed dirty filter material which goes to the bottom of the filter tank may pass on out of the tank, the bottom of the tank is provided with a fairly large outlet opening 25 to which is connected a pipe 26 leading to a settling tank 27. The pipe 26 is provided with a hand operated cut-off valve 28 so that it can be closed, except when filter material is desired to be removed from the tank. The settling tank has two compartments 29 and 30 separated by a low partition 31. The drain pipe 26 enters the bottom part of the compartment 29 at a point below the partition 31 and thus liquid and the dirty filter material coming from the filter tank will collect in the bottom of the compartment 29 where it will settle out. Since this filter material is fairly heavy, it will settle out quite rapidly and relatively clear liquid will flow over the top of the partition into the compartment 30. If desired, a filter screen and bag 32 may be positioned between the compartments, as best shown in Figure 6, so as to aid in preventing excessive filter material from being carried into the compartment 30. The compartment 30 has its lower portion connected by a conduit 33 to the inlet of the pump 3 so that the liquid in this chamber can be re-circulated during the washing operation and also to permit clarified liquid to be pumped back into the cleaning system for reuse. The conduit 33 is provided with a hand valve 34.

To perform the filter washing operation the cleaning washer 1 will be disconnected from the filter tank by closing the valves 6 and 10 and the pump will be disconnected from the top of the filter tank by closing the valve 9. The valve 21 will be opened so that the pump can supply liquid through the conduit 20 into the auxiliary chamber 17 at the top of the filter tank. Also, the valve 28 of the drain pipe will be opened so that the bottom of the filter tank will be connected with the settling tank. When the drain pipe is open, all the liquid in the filter will be drained out in the settling tank 27 which should be of such capacity as to hold more liquid than the filter tank. The incoming liquid will rise to a level above the wall in both chambers. When the liquid is drained from the filter through the drain pipe, it will carry out accumulated "muck" from the bottom of the filter tank and this "muck" will settle out in the bottom of the chamber 29. When the tank is drained there will be some gas pressure in the tank which will keep the tank empty. If the pump 3 is now started, liquid can be forced into the chamber 17 under pressure. This liquid may be taken either from chamber 30 of the settling tank through conduit 33 by opening valve 34, or it can be taken from the storage tank through the conduit 15. The liquid under pressure in the chamber 17 will be conducted into the spray pipes 23 and forced in streams out of the holes 24 and onto the surfaces of the filter bags. The streams of liquid under pressure will then act to "peel" off the dirty filter material deposited on the filter bags and as it falls down into the bottom of the filter it will be washed out into the chamber 29 of the settling tank. This washing will also insure that all accumulated "muck" in the bottom of the tank will be removed. During the washing process it will not matter whether the liquid being circulated contains small particles of filter material as such will do no harm during the washing process and the "peeling" off of the deposited filter material. The washing process to clean the filter bags will not consume an excessive amount of time, but it will vary some, depending upon the amount of filter material accumulated on the filter bags and also the "tightness" of the deposit of filter material. Generally a washing operation covering fifteen or twenty minutes will be sufficient to completely clean the filter bags. Under no circumstances will it take more than thirty to thirty-five minutes. During washing the pumped liquid pressure should be around or above four pounds per square inch. When the filter washing operation is completed the valve 28 in the drain pipe and the valve 21 in the conduit leading to the washing chamber 17 will be closed and the valves 6, 9 and 10 opened so as to reconnect the pump and washer 1 to the filter tank. The filter tank can then be filled with clean liquid by the use of the pump 3, this clean liquid coming from the usual storage tank or from the chamber 30 of the settling tank. Generally the filter washing operation of the filter bags will be accomplished at the end of the day and the liquid employed during washing will be allowed to settle over night in the settling tank. Consequently the liquid in the settling tank will be free of dirty filter material and it can be re-used in the system instead of a new supply from the storage tank. If there is not sufficient liquid in the settling tank to fill the filter tank and washer, it can be supplemented from the storage tank. New filter material will be placed in the system and as the pump circulates the liquid and the filter material will be deposited on the cleaned filter bags in a manner already noted.

If desired, the lower portion of the filter tank below the outlet manifold and above the bottom of the tank can be connected by a conduit 35 with the conduit 7 leading to the inlet of the pump. The conduit can be controlled by a valve 36. Thus liquid can be circulated by pump 3 from the bottom portion of the filter tank to the top thereof merely by opening the valve 36 whenever such circulation may be desired. Under certain conditions the drain pipe 26 may become so filled with "muck" and dirty filter material during use of the cleaning system that when the valve 28 is opened, liquid and filter material can not be drained into the settling tank. To clean this drain pipe of packed "muck" and filter material, there can be provided a conduit 37 from the outlet side of the pump 3 to the drain pipe 26 ahead of the valve 28. This conduit can have a valve 38. Thus by opening the valve 38, liquid under pressure can be forced into the drain pipe 26 and with the valve 28 closed it will push the "muck" accumulated in the drain pipe back so that liquid and "muck" will flow therethrough when the valve 28 is opened.

With our improved filter washing system associated with a dry cleaning system embodying a filter tank having filters, it is seen that it is very easy to wash the filters of all dirty filter material deposited thereon. It is not necessary to do any filter scraping or remove the filters. Also, no mechanical devices for agitating the filters are necessary. To perform the filter operation it is merely necessary to close certain valves to disconnect the washer from the filter tank and to open up other valves so as to connect the pump into the filter washing system. The operation of the pump will then accomplish the filter bag washing and the "muck" and dirty filter material will be deposited in a settling tank where it will readily settle out during an interval of time so as to permit re-use of the liquid. The "muck" and dirty filter material which settles in the bottom of the compartments 29 and 30 of the settling tank can be readily moved by shoveling it out after the clear liquid in the settling tank has been pumped back into the cleaning system. If desired, the settling tank can be provided with any suitable cover 39 having a handle 40 for removing it.

It is to be particularly noted that in the improved filter washing system disclosed by way of example as embodying our invention, that the same pump employed in cleaning systems is also employed in the washing system. The washing system is easily adapted for association with any types of filters. The washing system is a time saver since during the washing interval no operator's attention is required, thus allowing the operator to perform other duties. Neither the bottom nor top of the filter tank needs to be removed to perform the filter cleaning. All dirty filter material and "muck" is removed from the filter tank and deposited in a separate settling tank where it can be removed conveniently. Removing all "muck" from the bottom of the filter tank is simplified. The filter tank is always empty during filter washing as the tank is first drained before the pump is started and during washing gases from the washing liquid will maintain such a positive pressure in the tank as to prevent any return flow from the settling tank to the filter tank because of difference in liquid levels. The washing system also prevents any accumulation of filter material in the storage tank. The liquid to be re-used is clarified in the settling tank. With the improved washing system it is also possible to drain "muck" from the filter tank during operation of the cleaning system. If, during a day's run, an excessive amount of "muck" accumulates in the bottom of the filter tank, the drain pipe can be opened for a short period of time, thus allowing some liquid and "muck" to enter the settling tank. The liquid passing out with the "muck" can be replaced from the storage tank.

In Figure 7 a modified structure for washing the filter bags is disclosed. In the top of the filter tank 2 there is provided a washing chamber 17' formed by the top wall 18 of the filter tank and a concave bottom wall 19'. In place of the spray pipes 23 this bottom wall 19 is provided with a plurality of holes 41 which are so drilled through the bottom wall as to direct liquid under pressure onto the filter bags at an acute angle so that it will be possible to wash the filter bags clean of deposited filter material. Thus when the system is conditioned so that liquid under pressure from the pump is supplied through the conduit 20 to the chamber 17', this liquid will then be sprayed out through the holes 41 with such force that the filter material will be "peeled" off from the filter bags and the filter bags cleaned in the same manner as when the spray pipes 23 are employed in the system previously described.

Another way in which the washing of the filter screens can be accomplished is shown in Figure 8. In the top of the filter tank 2 there is formed a separate washing chamber 42 which is arranged to be movable relatively to the filter tank. The chamber is formed by an imperforate convex top wall 43 and a concave bottom wall 44 provided with a plurality of perforations or jet holes 45. The washing liquid under pressure is supplied to the chamber 42 through a pipe 20' which is so mounted in the side wall of the filter tank by means of packing gland bearing 46 that it can act as a pivotal shaft. Diametrically opposite the inlet pipe 20' the chamber is provided with a short pivot shaft 47 which is arranged to have bearing support in the side wall of the filter tank by a suitable packing gland bearing 48. This shaft 47 has a downwardly extending handle portion 49 whereby the shaft 47 can be rocked and also the chamber since the shaft is connected with the chamber. In using this washing arrangement for the filter bags, the action will be substantially the same as that shown in Figure 7, but it is possible with the liquid washing chamber being pivotally mounted in the top of the filter tank to give the perforated bottom wall 44 of the chamber a rocking or swinging movement so that the streams of liquid coming from the chamber through the perforations can be directed in various directions. The perforations in the bottom wall can be made so that when the chamber is in a normal horizontal position the streams of liquid can have a directly downward flow and when it is desired to cause these streams to be directed at an angle onto the surfaces of the filter bags, the bottom wall can be shifted by moving the handle 49. Thus the streams coming from the perforations can be directed so as to clean like sides of the filter bags and by a shift of the chamber the streams can be directed to clean the opposite sides of the filter bags.

Being aware of the possibilities of modification in the various structures disclosed by way of example without departing from the fundamental principles of our invention, it is not intended that the scope of the invention be limited in any manner except in accordance with the appended claims.

What is claimed is:

1. In combination with a cleaning system comprising a cleaning washer, a filter tank having spaced filter structures vertically mounted therein and upon which filter material is deposited, a pump, an inlet, an outlet and conduits for circulating cleaning liquid from the pump to the filter tank to the washer and back to the pump, of a filter washing system comprising a valve controlled drain pipe from the bottom of the filter tank separate from the tank outlet, means for supplying liquid under pressure from the pump to the top of the filter tank independently of the inlet and for spraying said liquid onto the filter structures, and means for supplying liquid from the pump to the drain pipe ahead of the valve thereof.

2. In combination with a filter tank containing spaced vertically arranged stationary filter structures extending substantially across the tank and upon which filter material is deposited and having associated therewith a liquid circulating system including a pump connected to supply liquid to the top of the filter tank, of a drain conduit connected to the bottom of the filter tank, means providing a liquid chamber above the filter structures, means for supplying liquid under pressure to the chamber, stationary spray pipes positioned between the filter structures and on the outside of the outer filter structures and extending substantially the width of the filter structures for directing streams of liquid onto the surfaces thereof adjacent the top ends, and means for supplying liquid to the spray pipes from the chamber.

3. In combination with a filter tank having a top wall and containing spaced vertically arranged filter structures upon which filter material is deposited and having associated therewith a liquid circulating system including a pump connected to supply liquid to the top of the filter tank, of a drain conduit connected to the bottom of the filter tank, means comprising a wall below the top wall of the tank and co-extensive therewith to thereby provide with the top wall a liquid chamber above the filter structures and extending over substantially the whole area covered by the top edges of the filter structures, said last named wall being provided with spray openings, and means for supplying liquid under pressure to the chamber to thereby cause liquid to be sprayed in a downward direction onto the filter structures.

4. In combination with a filter tank containing spaced vertically arranged filter structures upon which filter material is deposited and having associated therewith a liquid circulating system including a pump connected to supply liquid to the top of the filter tank, of a drain conduit connected to the bottom of the filter tank, means providing a single liquid chamber above and of a size to extend over the filter structures and provided in its bottom wall with spray openings, said bottom wall of the chamber being of an area to cover substantially all of the top edges of the filter structures, means for supplying liquid under pressure to the chamber to thereby cause liquid to be sprayed in a downward direction onto the filter structures, means for mounting the chamber for movement relative to the tank, and means for moving the chamber to thereby change the direction of the spray streams.

5. In a filter washing system for association with a filter tank having a top wall, an inlet, and an outlet and being provided therein with spaced vertically arranged stationary filter structures the top portions of which are spaced from the top wall of the tank, a drain conduit from the bottom of the tank and being separate from the outlet, means providing a wall in the top portion of the tank co-extensive with and spaced below the top wall to thereby form with the top wall a liquid chamber above the top portions of the filter structures and covering substantially the same area as covered by the said top portions, means for supplying washing liquid under pressure to the chamber independently of the inlet, and means for spraying the washing liquid from the chamber in a downward direction onto the filter structures to thereby wash all of the said structures filter surface without the necessitiy of moving the structures.

6. In combination with a filter tank containing spaced vertically arranged stationary filter structures extending substantially across the tank and upon which filter material is deposited and having associated therewith a liquid circulating system including a pump connected to supply liquid to an inlet at the top of the filter tank, of a drain conduit connected to the bottom of the filter tank, means providing a liquid chamber above the filter structures and the inlet, means for supplying liquid under pressure to the chamber independent of the tank inlet of the circulating system and by the pump and a conduit from the circulating system, and means for spraying liquid from the chamber in a downward direction onto substantially the entire side surfaces of the filter structure adjacent the tops thereof so as to wash said surfaces without movement of the filter structures.

7. In combination with a cleaning system comprising a cleaning washer, a filter tank having spaced filter structures vertically mounted therein and upon which filter material is deposited, a pump, an inlet, an outlet, and conduits for circulating cleaning liquids from the pump to the filter tank to the washer and back to the pump, of a filter washing system comprising a valve controlled drain pipe from the bottom of the filter tank separate from the tank outlet, a chamber in the top of the tank above the inlet, and means for supplying liquid under pressure from the pump to the chamber in the top of the filter tank and for spraying said liquid from the chamber onto the side surfaces of the filter structures adjacent the top ends thereof.

HERBERT H. MARSH.
GLENN G. SHORT.

REFERENCES CITED

The following references are of record in the file of this patent:

UNITED STATES PATENTS

| Number | Name | Date |
|---|---|---|
| 869,372 | Kelly | Oct. 29, 1907 |
| 1,219,796 | Atkins | Mar. 20, 1917 |
| 1,510,568 | Sweetland | Oct. 7, 1924 |
| 1,989,306 | Beatty | Jan. 29, 1935 |
| 2,013,776 | Wiesman | Sept. 10, 1935 |
| 2,044,096 | Moran | June 16, 1936 |
| 2,087,775 | Matthews | July 20, 1937 |
| 2,435,201 | Cooperider | Feb. 2, 1948 |

FOREIGN PATENTS

| Number | Country | Date |
|---|---|---|
| 629,059 | France | July 12, 1927 |